United States Patent [19]
Papadopoulos et al.

[11] Patent Number: 6,137,879
[45] Date of Patent: Oct. 24, 2000

[54] COMPUTER TELEPHONY HEADSET AMPLIFIER

[75] Inventors: Costas Papadopoulos; David J. Truesdell, both of Acton, Mass.; Daniel S. Davidson, Somersworth, N.H.

[73] Assignee: VXI Corporation, Rollinsford, N.H.

[21] Appl. No.: 09/130,745

[22] Filed: Aug. 7, 1998

[51] Int. Cl.[7] .................................................. H04M 1/00
[52] U.S. Cl. .......................... 379/387; 379/395; 455/439
[58] Field of Search .............................. 379/90.01, 93.01, 379/93.06, 93.09, 88.04, 100.15, 214, 387, 395; 455/426, 568, 439

[56] References Cited

U.S. PATENT DOCUMENTS

| | | | |
|---|---|---|---|
| 5,712,901 | 1/1998 | Meermans | 379/88 |
| 5,714,321 | 2/1998 | Andrea et al. | 381/92 |
| 5,870,464 | 2/1999 | Brewster et al. | 379/219 |
| 5,875,242 | 2/1999 | Glaser et al. | 379/207 |
| 5,912,964 | 6/1999 | Stelman | 379/387 |
| 5,926,543 | 7/1999 | Lynn et al. | 379/395 |
| 5,983,100 | 11/1999 | Johansson et al. | 455/426 |
| 5,991,398 | 11/1999 | Lipton et al. | 379/383 |
| 5,991,645 | 11/1999 | Yuen et al. | 455/568 |
| 6,009,082 | 12/1999 | Caswell et al. | 370/276 |
| 6,021,119 | 2/2000 | Derks et al. | 370/261 |

*Primary Examiner*—Richemond Dorvil
*Assistant Examiner*—Susan Wieland
*Attorney, Agent, or Firm*—Samuels, Gauthier & Stevens, LLP

[57] ABSTRACT

A computer telephony system including a telephone communication unit operable for initiating and receiving voice calls and a computer operable for providing and receiving voice data. Circuitry is provided for coupling voice data between the computer and the telephone communication unit simultaneously with the voice calls, and for isolating the voice data from the voice calls. In another embodiment of the invention, there is provided a computer telephony amplifier for use with a telephone communication unit operable for initiating and receiving voice calls and a computer operable for providing and receiving voice data. The amplifier includes circuitry for transmitting and receiving voice data between the computer and the telephone communication unit simultaneously with the voice calls, and for isolating the voice data from the voice calls.

23 Claims, 6 Drawing Sheets

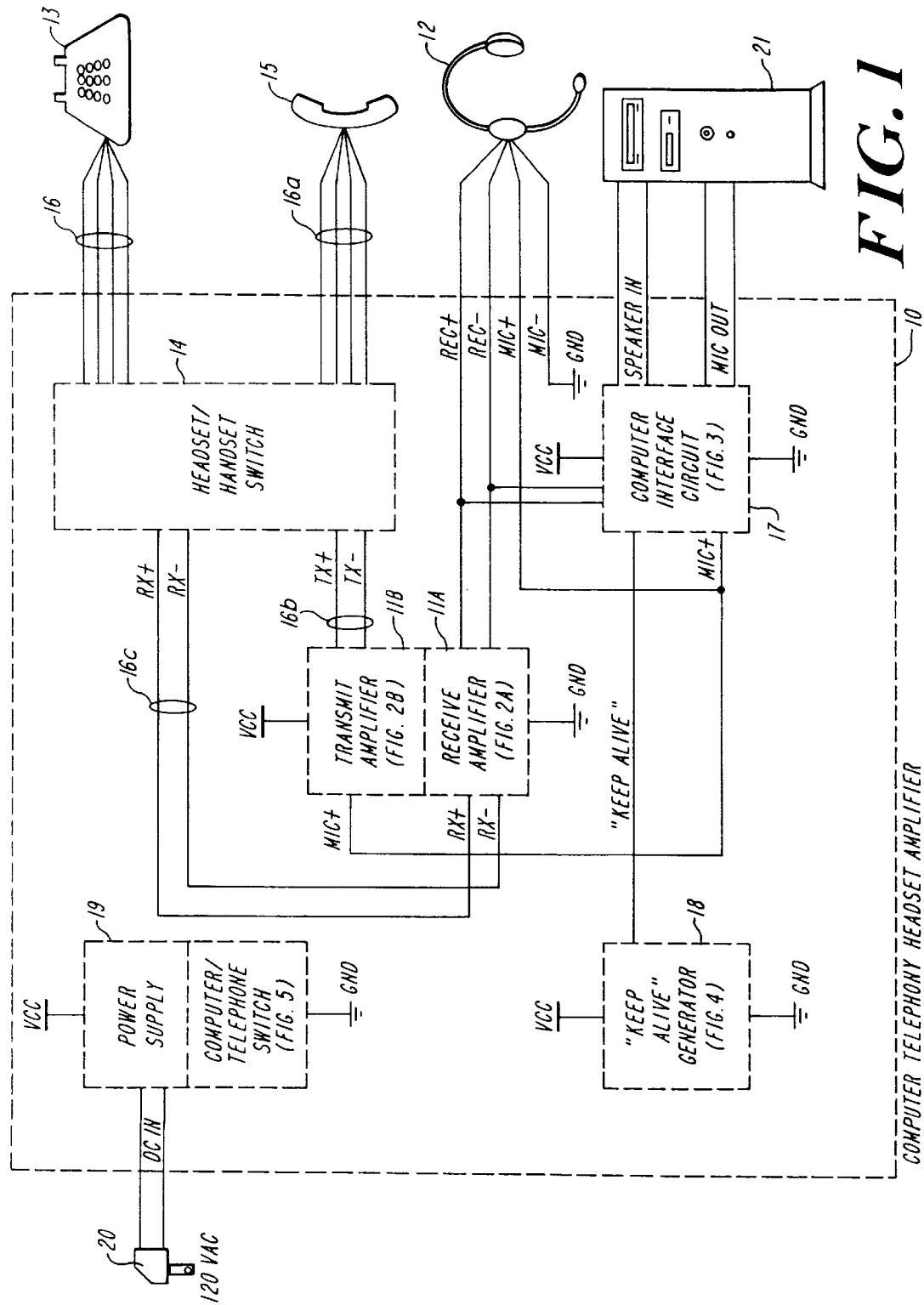

COMPUTER TELEPHONY HEADSET AMPLIFIER

BACKGROUND OF THE INVENTION

The invention relates to telephony headset amplifiers, and in particular to headset amplifiers for use with computers.

Speech recognition software is a tool for increasing office productivity, particularly for entering text in word processing applications with personal computers. Such software performs best when voice input is provided via a "close talking" headset microphone, i.e., a microphone with acoustic cancellation of background noise. The microphone is connected to the corresponding input connector of the computer sound card. It is evident that by wearing a headset, dictation becomes a hands-free operation and is therefore valuable for individuals with limited use of hands or arms. When the person dictating text via the headset microphone wishes to use the telephone, an awkward situation develops, that of having to remove the headset in order to use the telephone handset. The application of headsets in telephony is common. The acoustic and electrical characteristics of headsets for speech recognition and telephony, however, are different.

One headset is not usable for both applications unless it is first connected to an interface apparatus, which then provides suitable outputs to the personal computer sound card and to the telephone. An exemplary product is Plantronics model CATM10. The Plantronics apparatus offers the conventional telephony headset amplifier functions such as receive volume adjustment, microphone mute, headset-handset selection, and also includes a transfer switch. One switch position enables the path to the telephone and totally opens the path to the computer. The opposite occurs in the second position.

While such prior art headsets provide a solution using only one headset for telephony and speech recognition, it falls short in one important call center application: when a customer calls in to place an order, the operator should be able to repeat the information into the order processing software. In other words, the called party (the operator) must be able to listen while dictating to the computer, remaining inaudible to the calling party (the customer). The exemplary prior art product also includes a six-position multi-pole compatibility switch with which the user can match the amplifier with the type of telephone it is connected to. Such telephones may have three or four wire handsets with electret, dynamic or carbon microphones with differing impedances and signal levels hence the need for a compatibility switch.

It is alternatively possible to construct a headset with a common headband, but two with independent sets of transducers, for example, a "left" side with the appropriate microphone, speaker and cable connected to the computer and a "right" side with the corresponding parts for the telephone. The resulting headset, although electrically correct will be inconveniently burdened with two microphone booms and two cables.

SUMMARY OF THE INVENTION

Accordingly, the invention provides a computer telephony system including a telephone communication unit operable for initiating and receiving voice calls and a computer operable for providing and receiving voice data. Circuitry is provided for coupling voice data between the computer and the telephone communication unit simultaneously with the voice calls, and for isolating the voice data from the voice calls.

In another embodiment of the invention, there is provided a computer telephony amplifier for use with a telephone communication unit operable for initiating and receiving voice calls and a computer operable for providing and receiving voice data. The amplifier includes circuitry for transmitting and receiving voice data between the computer and the telephone communication unit simultaneously with the voice calls, and for isolating the voice data from the voice calls.

The invention overcomes the aforementioned and additional deficiencies of the prior art. First, with the combined "left and right" headset, the user is required to deactivate the computer software by saying "go to sleep" or "stop listening" while using the telephone because the two headset paths are totally independent but always enabled. In order to reactivate the software, a command such as "wake up" or "listen to me" is needed. Such utterances may confuse a caller who is not aware that speech recognition is being used by the called party. Second, the prior art devices with a transfer switch exclusively connecting to the telephone or to the computer creates an undesirable condition for the software when in the telephone position: the speech recognition program hears nothing, attempts to increase microphone sensitivity to process inaudible information and becomes saturated (causing a significant delay of several seconds) when the switch is moved and voice returns to the computer.

The invention entails a headset amplifier with circuitry to overcome these deficiencies while also avoiding the cost and inconvenience of a multi-pole, multi-position telephone compatibility switch. A simple "mute" switch will direct the microphone signal to the computer or the telephone, and will be optionally supplemented by a foot-operated switch for handicapped users. When in the telephone position, a "keep alive" signal will be injected into the computer microphone input. This signal will be shown to have characteristics unlike speech, thus preventing misinterpretation, and will be of sufficient amplitude to prevent attempts by the software to increase microphone sensitivity. The headset user will have simultaneous listening capability from the telephone (to hear the calling party) and the computer (to hear music or "text to speech" messages). The calling party will hear no clicks or other artifacts when the user of the present invention switches the microphone signal between the computer and the telephone.

These and other objects, features and advantages of the present invention will become apparent in light of the following detailed description of preferred embodiments thereof, as illustrated in the accompanying drawings.

BRIEF DESCRIPTION OF THE DRAWINGS

FIG. 1 is a block diagram of a computer telephony headset amplifier in accordance with the invention;

DETAILED DESCRIPTION OF THE INVENTION

Figure 2A:
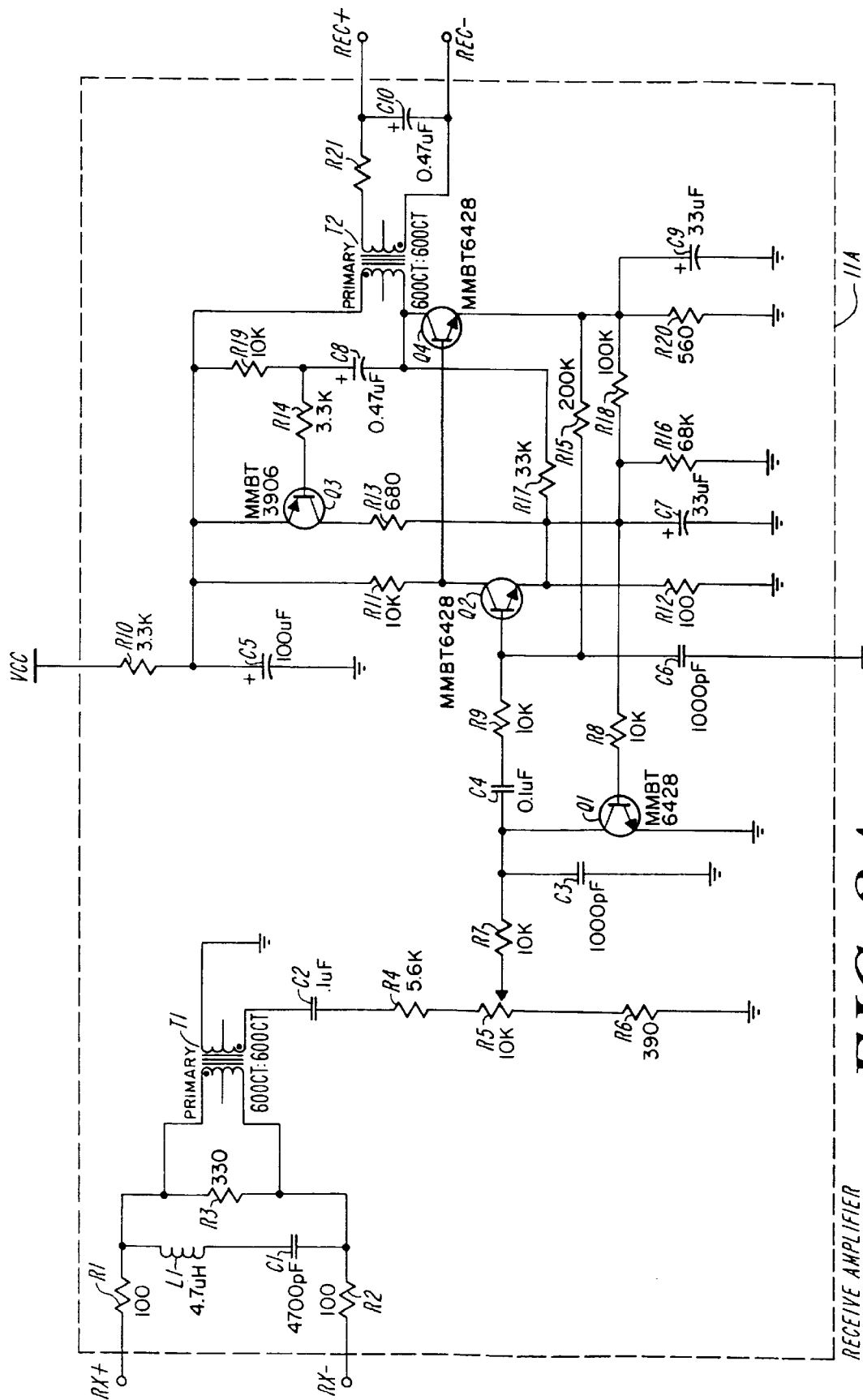
FIGS. 2A and FIG. 2B are schematic diagrams of exemplary telephone receive and transmit amplifiers in FIG. 1.

Referring to FIG. 1, a computer telephony headset amplifier 10 includes a transmit/receive amplifier 11A/11B adapted for coupling to a headset 12 in order to adjust the amplitude of signals between the headset 12 and a telephone 13. A headset/handset switch 14 permits use of the telephone 13 via a handset 15, as before headset amplifier 10 was introduced, as well as via the headset 12. This function is commonly performed with a four-pole double-throw switch alternately connecting each of four wires 16 at the telephone handset jack to the handset 15 or the headset 12. Thus the four wires 16 are commutated either to the handset 15 as indicated by 16a or to transmit/receive amplifier 11A/11B, one pair 16b for transmit (TX+, TX−) and one pair 16c for receive (RX+, RX−). Additionally, the headset amplifier includes a computer interface circuit 17 for interfacing with a computer 21, and a "keep alive" generator 18 in order to provide suitable signals from the same headset for speech enabled software. Finally, a power supply and computer/telephone switch 19 provide +5 VCC power to the circuits and permit the user to access the computer or the telephone at will. Power is obtained from an AC adaptor 20.

Referring now to FIG. 2A, the receive amplifier 11A will be described in connection with differing requirements among exemplary telephone types. The receive amplifier signal path begins with input terminals RX+, RX−, followed by terminating resistors R1, R2, R3, and radio interference suppression filter L1, C1 to the primary winding of transformer T1. It is therefore evident that the telephone 13 receive pair 16C is transformer isolated from the remaining circuits of the invention and the significance of maintaining such isolation will be discussed hereinafter.

Receive amplification occurs between the secondary of T1 and the primary of transformer T2 by NPN transistors Q2 and Q4. The transistors are DC coupled with DC feedback via resistors R15 and R17, operating at +b 5VCC and 1 mA. Variable resistor R5 acts as a volume control for the user of the headset 12 (FIG. 1). Transistors Q3 and Q1 perform a gain limiting function for hearing protection. When the receive output signal swing at the Q4 collector is high, PNP transistor Q3 turns on to charge capacitor C7 quickly through resistor R13. When the voltage at C7 exceeds VBE or approximately 0.6 V, NPN transistor Q1 turns on such that its collector presents a shunt load in the signal path, thus reducing gain. This automatic gain control (AGC) function has a fast attack time determined mostly by R13 and C7 of approximately 680Ω×33 μF=22 msec, and a slow decay due to R16//R18//C7=68 kΩ×100 kΩ×33 μF=1.3 sec.

Frequency shaping in order to comply with telephony headset requirements such as Bellcore Technical Reference TR-NPL-000314 is provided by several RLC components: high pass to avoid unwanted gain below 300 Hz is determined by T1, then capacitor C2 with resistors R4, R5, R6, then capacitor C4 with resistor R9, and finally by T2. Low pass filtering in order to attenuate frequencies above 3 kHz is provided by resistor R7 with capacitor C3, resistor R9 with capacitor C6, and resistor R21 with capacitor C10.

Figure 3:
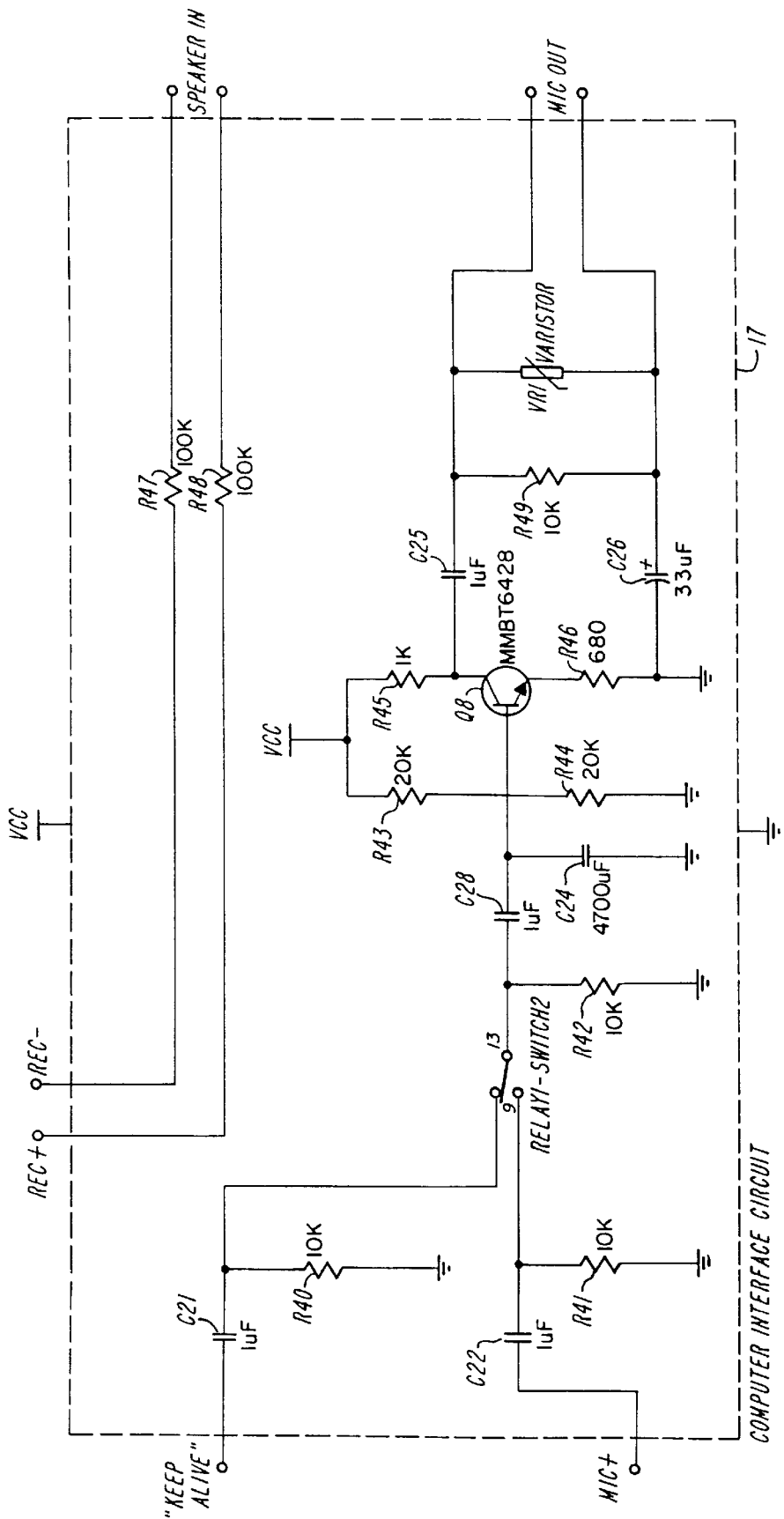
FIG. 3 is a schematic diagram of an exemplary computer interface circuit in FIG. 1.

The output of the receive amplifier of FIG. 2A is again transformer isolated and appears at terminals REC+ and REC− coupled directly to the receiver of headset 12 (FIG. 1). Referring now to FIG. 3, an additional path to the receiver of headset 12 is from the computer 21 to the SPEAKER IN terminals of computer interface circuit 17 through resistors R47 and R48. In other words, there is a three way parallel connection linking three ports: the computer sound card speaker output, the headset receiver and the receive amplifier T2 secondary winding (FIG. 2A). The user of headset 12 is able to listen to the telephone and the computer simultaneously. The impedance levels are correct as seen by each of the three ports. Typically, the headset 12 receiver impedance is 32Ω and the computer speaker amplifier output impedance presented to the SPEAKER IN terminals in FIG. 3 is very low.

The load seen by the first port, the T2 output of the receive amplifier (FIG. 2A) is approximately 32Ω//(100Ω+100Ω)= 28Ω, not too low and certainly not the AC short that a direct connection without 100Ω resistors would cause. The load seen by the second port, the computer speaker output is greater than 200Ω. There will be a loss of volume from the computer to the headset due to this 200Ω impedance driving the 32Ω receiver load, but this is in fact desirable because headset receive requires only a few milliwatts of audio power while computer speaker amplifiers provide much higher levels. At any rate, the computer volume control soft key can be used to adjust to the desired low level. One of the benefits of transformer isolation by way of T2 is that there is no common path to ground between the telephony receive amplifier and the computer speaker amplifier, thus no undesirable coupling of AC hum and other common mode signals can occur.

Figure 2B:
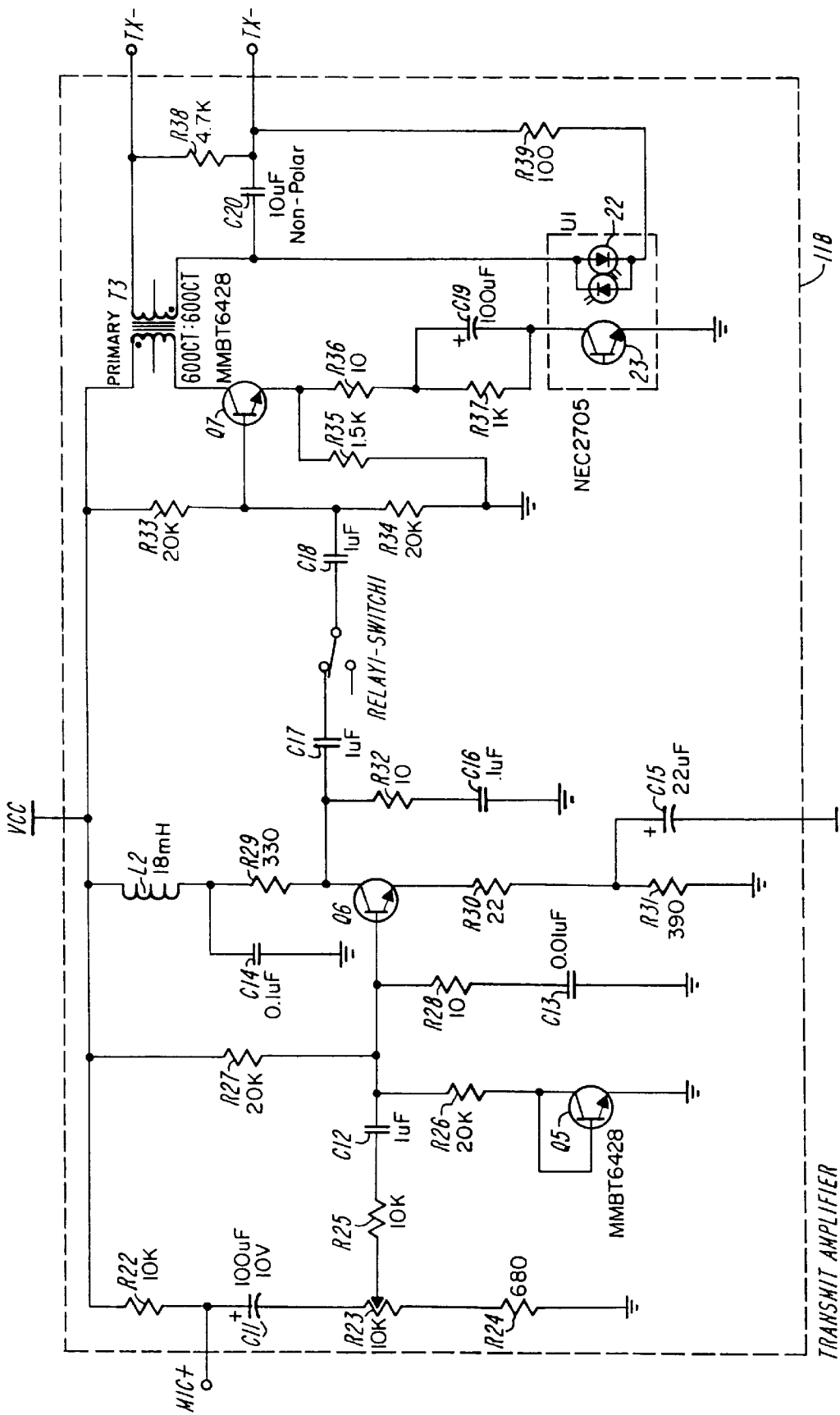

Continuing now with the transmit amplifier 11B in FIG. 2B, terminal MIC+ provides DC bias to the electret microphone of headset 12 (FIG. 1) through resistor R22. Typically, such electrets operate at 200 μA bias current. Here with +5.0 VCC and R22=10 kΩ, the voltage at MIC+ is 3.0 V. Riding on this DC level will be voice frequency signal swings of perhaps 30 mV. Variable resistor R23 is adjusted by the user for a comfortable transmit level during a trial telephone conversation. The mic signal is amplified by NPN transistor Q6 and once more RLC components are inserted for frequency shaping, for instance as mandated by Bellcore. In addition to high pass components C12 and C17 and low pass components C13 and C16, there is a frequency peak at approximately 3 kHz formed by tank circuit L2, C14 and R29. Thus, the transmit frequency response (approximately) rises to a −3 dB point at 300 Hz, becomes flat to 1 kHz, rises to a +6 dB peak at 3 kHz and then falls steeply.

A second gain stage follows, comprising NPN transistor Q7 and adjacent components. RELAY1-SWITCH1 is placed between stages Q6 and Q7 and will be discussed hereinafter with reference to FIG. 5. It is shown here in the telephony position. The AC gain of Q7 will be at one of two values determined by the type of telephone the headset amplifier is connected to: electronic or carbon. So-called electronic handset telephone stations use electret or dynamic mic elements and require mic signal levels in the tens of millivolts. Carbon transmitter telephones operate with mic signal swings in the hundreds of millivolts.

Examining the dynamic microphone instance first, when the amplifier of the invention is in the headset position, there is generally no DC at terminals TX+, TX−, thus optoisolator U1 LEDs 22 are off and output 23 is also off. The Q7 gain is set by 1.5 kΩ emitter resistor R35. When the telephone has an electret mic handset, a few hundred microamps DC of unknown polarity will flow through 4.7 kΩ resistor R38 developing several hundred millivolts. Optoisolator U1 will be off as before. In both cases, the transmit amplifier output from transformer T3 secondary winding is coupled through non-polar 10 μF capacitor C20 to TX+, TX−. Resistor R38 also acts as a "dummy electret load" so that telephone stations such as Northern Telecom M7310 will not revert to a speakerphone or other mode when the handset electret current path is broken.

A carbon telephone connection will result in significant current, say 30 mA of unknown polarity to flow through 100Ω resistor R39, U1 LEDs 22 and the low resistance secondary of T3. U1 will now be on and output 23 will sink the Q7 emitter current through resistors R36 and R37. The Q7 AC gain will be set by Q7 $r_e$+R36. Q7 operating at +5 VCC is biased by equal resistors R33, R34 such that the base voltage of 2.5 V results in an emitter voltage of 1.9 V and a current of 1.9 mA set by 1 kΩ resistor R37. A rule of thumb for $r_e$=26 mV/1.9 mA=14Ω. This can now be added to 10Ω resistor R37 to determine Q7 gain. The ratio of transmit gains from carbon to electronic is R35/($r_e$+R36)=1500/(14+10)=62.5. Output loading effects and Q7 finite beta have been neglected, which will lower this gain ratio but will still ensure significantly higher carbon output. It will be appreciated that this carbon/electronic change occurs automatically and the user of the invention is not required to set any switches or make wiring changes at the time of installation regardless of telephone type. This feature will have additional merit for users who travel with portable computers and who will inevitably encounter a wide variety of telephone instruments.

Isolation is maintained by transformer T3 and optoisolator U1 to prevent undesirable coupling between telephone 13, headset amplifier 10 and computer 21 (FIG. 1). Without such isolation, telephone 13 will see a path via the computer to AC power ground resulting in line imbalance and possible harm to the telephone network.

Returning now to FIG. 3, the microphone path for dictation to the computer will be traced. When computer/telephone switch 19 (FIG. 1) is in the computer position, the signal at MIC+ (FIG. 3) passes through RELAY1-SWITCH2 to NPN transistor amplifier Q8. This stage has a flatter and wider frequency response than the telephony transmit amplifier in order to reproduce voice faithfully for speech recognition by computer software. For example, the low frequency −3 dB point is approximately 32 Hz, determined by capacitor C22 and resistors R41//R42 with a high frequency roll off at about 10 kHz due to capacitor C24 with resistors R41//R42//R43//R44. Transistor Q8 has a modest gain of 1.5 set by resistors R45/R46=1 kΩ/680Ω, only intended to overcome signal splitting loss as the headset electret signal at MIC+ is applied to two stages 11B and 17 (FIG. 1).

The stage Q8 (FIG. 3) is coupled to the MIC OUT terminals and is thereby connected to the computer sound card. For isolation, both terminals are capacitively coupled via capacitor C25 at the Q8 collector and via capacitor C26 at the headset amplifier ground. It is not necessary to provide transformer coupling at this point as elsewhere, since all other external signal paths have been so isolated. It is useful, however, to connect computer and headset amplifier grounds not directly but capacitively with C26 in order to prevent AC hum at 60 Hz. Resistor R49 is another "electret dummy load" to conduct bias current that may be sourced by the sound card and intended for a microphone. Varistor VR1 affords circuit protection at this port from electrostatic discharge.

Figure 4:
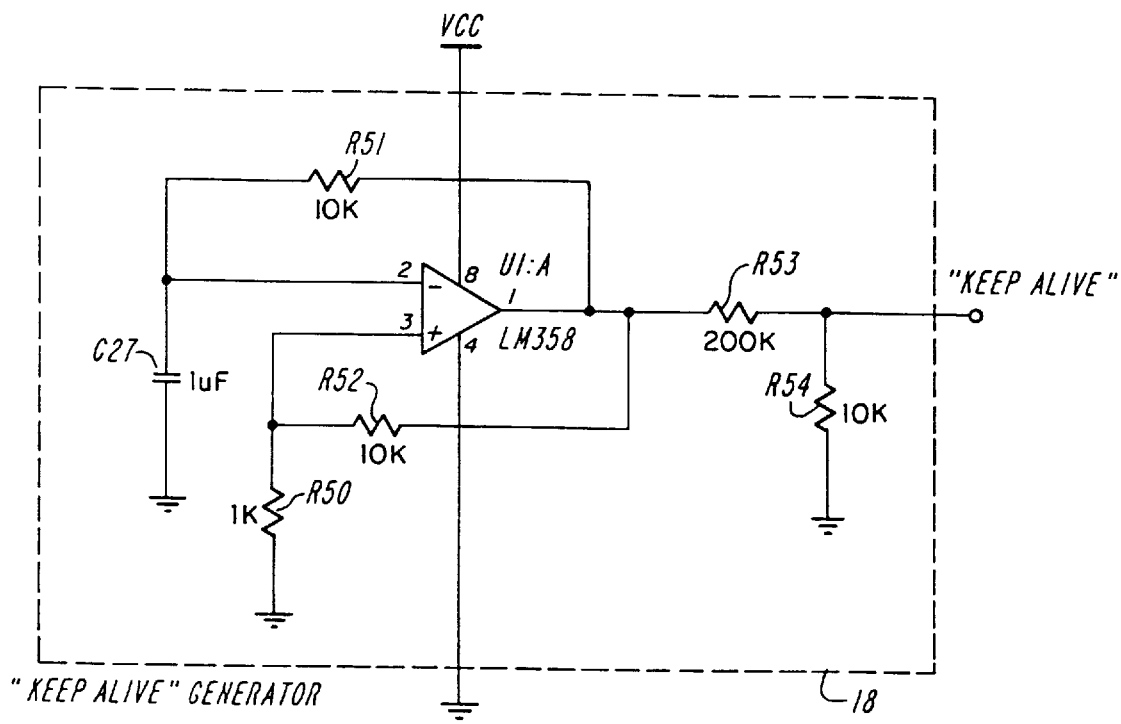
FIG. 4 is a schematic diagram of an exemplary "keep alive" generator in FIG. 1.

FIG. 4 is a schematic diagram of a "keep alive" stage generator 18 which provides a signal to the computer at MIC OUT when RELAY1-SWITCH2 (FIG. 3) is in the telephony position as shown. It may seem counterintuitive that a "nonsense" signal to the computer is preferable over silence during intervals of telephone calls by the user of the present invention. The "keep alive" signal puts the software in a stable but suspended state, immediately available to respond to speech without using voice or keyboard commands to enable the microphone. The only action needed is to actuate the familiar MUTE switch S1 (FIG. 5) found on any telephony headset amplifier with or without computer functionality. Thus, when the microphone is muted to the telephone, it is connected to the computer.

Several "keep alive" signals are suitable, for example white noise generated by a zener diode, pink noise, pseudo-random digital bit streams from shift registers, as well as arbitrary repetitive waveforms. The signal should provide a picket fence of spikes in the frequency domain so that it appears dissimilar to voice. One example of a repetitive waveform for this application is AC ripple such as from a power supply. This ripple will have a 60 or 120 Hz fundamental component and several harmonics. Another exemplary waveform consists of short duration pulses with a low repetition rate easily obtained from a 555 timer IC. This output will generate a comb of harmonics in the voice frequency domain with nearly constant amplitude out to several kilohertz.

The exemplary embodiment of FIG. 4 includes a low duty cycle rectangular pulse generator using an op-amp with negative and positive feedback. A repetition rate of approximately 120 Hz is determined by capacitors C27 and R51 at the inverting input of opamp U1:A. A duty factor of about 1% is established by resistors R50 and R52 at the non-inverting input. This multivibrator waveform will swing almost rail to rail so resistor divider R53, R54 attenuates the output to several millivolts, a level comparable to that of the microphone. Thus, the FIG. 4 "keep alive" frequency, duty cycle and amplitude are set independently with simple components. Each of two FIG. 3 inputs "KEEP ALIVE" and MIC+ are followed by series C shunt R pairs then by RELAY1-SWITCH2 and finally shunt R42 and series C23. This arrangement prevents capacitive transients (clicks and pops) when the MUTE switch (FIG. 5) is toggled between the computer and the telephone.

Figure 5:
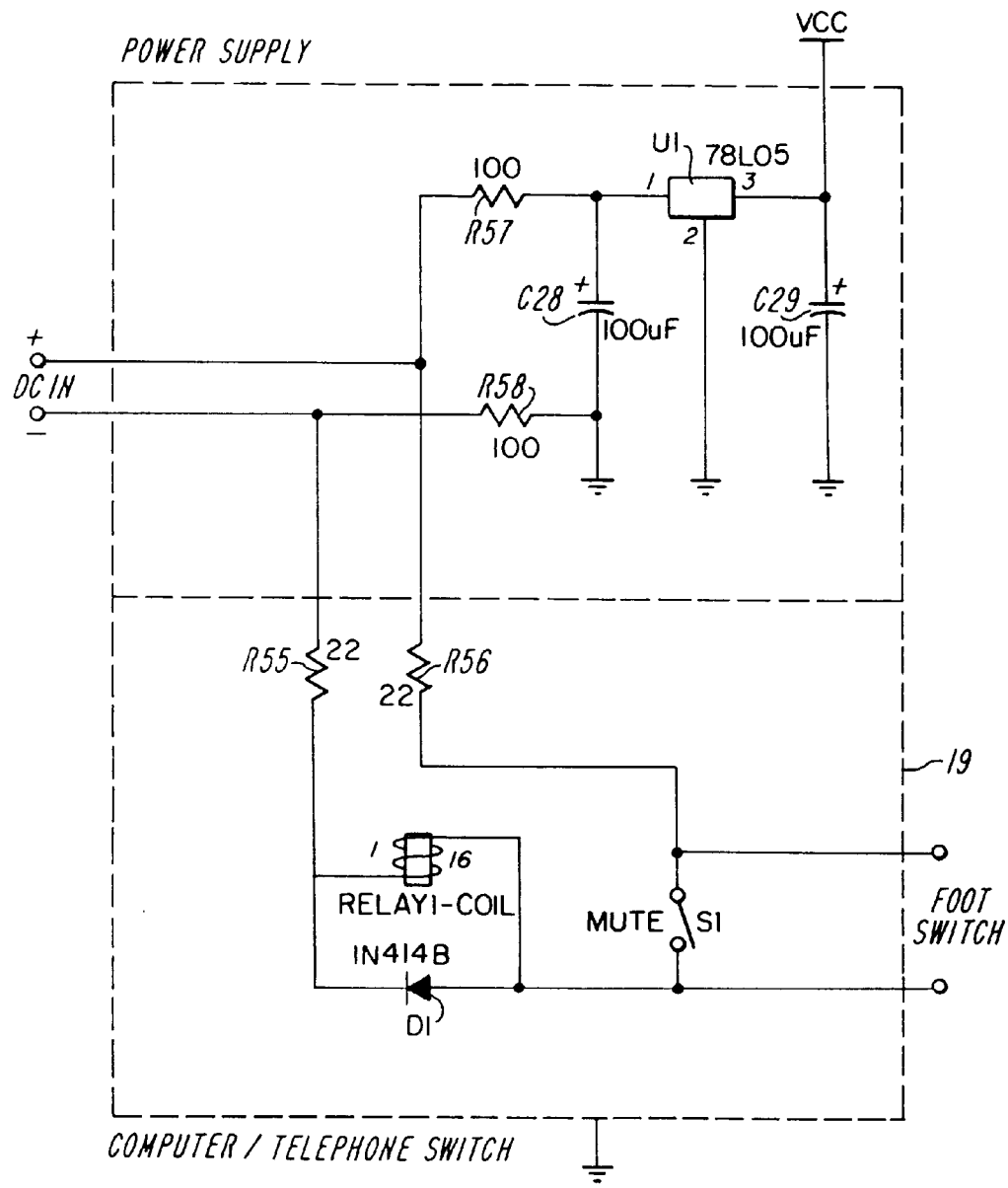
FIG. 5 is a schematic diagram of an exemplary power supply and computer/telephone switch in FIG. 1.

FIG. 5 is a schematic diagram of an exemplary power supply and computer/telephone switch in FIG. 1. In FIG. 5 a relay RELAY1-COIL is shown, energized by MUTE switch S1. The relay operates two sets of contacts (FIG. 2B and FIG. 3). An alternate embodiment may use a double-pole double-throw switch avoiding the cost of a relay. A DPDT MUTE switch and no relay will have low current drain and be suitable for battery operation. The relay, however, is preferred when an optional foot switch is to be connected. The power supply of FIG. 5 operates from the rectified, filtered, unregulated 9 V output of an outboard AC adaptor admitted at DC IN. Resistors R55, R56 separate the current path to the relay from the path to the regulator and work together with resistors R57, R58 and capacitor C28 to reduce AC ripple. Regulator U1+5V output is connected to all other active stages via terminal VCC.

Although the present invention has been shown and described with respect to several preferred embodiments thereof, various changes, omissions and additions to the form and detail thereof, may be made therein, without departing from the spirit and scope of the invention.

What is claimed is:

1. A computer telephony system comprising:
   a voice communication unit operable for providing a transmit path and a receive voice path;
   a telephone set operable for initiating and answering voice calls;
   a computer operable for inputting and outputting voice data;
   a coupling unit between said computer and said telephone, wherein said coupling unit directs said transmit voice path to either said telephone or to said computer selectively, and wherein said coupling unit directs said receive voice path from both said telephone and from said computer simultaneously; and means for isolating said said telephone from said computer.

2. The system of claim 1, wherein said isolating means comprises transformers, relays or capacitors, singly or in combination.

3. The system of claim 1, wherein said coupling unit is further operable for allowing the user of said voice communication unit to provide voice data to said computer and listen to said voice call, and not participate in said voice call.

4. The system of claim 1, wherein said coupling unit is further operable for allowing the user of said voice communication unit to participate in said voice call and listen to said voice data from said computer, and not provide voice data to said computer.

5. The system of claim 4, wherein said coupling unit transmits a signal to said computer instead of voice data in order to maintain a suspended state in said computer.

6. The system of claim 5, wherein said signal comprises white noise.

7. The system of claim 5, wherein said signal comprises pink noise.

8. The system of claim 5, wherein said signal comprises a repetitive waveform.

9. The system of claim 1, wherein said coupling unit comprises an amplifier.

10. The system of claim 9, wherein said amplifier comprises a self-configuring amplifier which is adaptable to various types of telephone sets.

11. The system of claim 10, wherein said amplifier provides low transmit gain for use with an electronic-type telephone set.

12. The system of claim 10, wherein said amplifier provides high transmit gain for use with a carbon-type telephone set.

13. The system of claim 1, wherein said voice communication unit comprises a telephone headset.

14. A computer telephony amplifier for use with a voice communication unit operable for providing a transmit voice path and a receive voice path, a telephone set operable for initiating and answering voice calls and a computer operable for inputting and outputting voice data, said amplifier comprising:

a coupling unit between said telephone and said computer, wherein said coupling unit directs said transmit voice path to either said telephone or to said computer selectively, and wherein said coupling unit directs said receive voice path from both said telephone and from said computer simultaneously; and means for isolating said telephone from said computer.

15. The system of claim 14, wherein said isolating means comprises transformers, relays or capacitors, singly or in combination.

16. The amplifier of claim 14, wherein said coupling unit is further operable for allowing the user of said voice communication unit to provide voice data to said computer, and to listen to said voice calls while not providing said voice data to said voice call.

17. The amplifier of claim 14, wherein said coupling unit is further operable for allowing the user of said voice communication unit to participate in said voice call and listen to said voice data from said computer, and not provide voice data to said computer.

18. The amplifier of claim 17, wherein said coupling unit transmits a signal to said computer instead of voice data in order to maintain a suspended state in said computer.

19. The amplifier of claim 14, wherein said voice communication unit set comprises a telephone headset.

20. The amplifier of claim 14, wherein said coupling unit is further operable for allowing the user of said voice communication unit to provide voice data to said computer and listen to said voice call, and not participate in said voice call.

21. The amplifier of claim 14 further comprising self-configuring circuitry for adapting to various types of telephone sets.

22. The amplifier of claim 21 further comprising circuitry for providing low transmit gain for use with an electronic-type telephone set.

23. The amplifier of claim 21 further comprising circuitry for providing high transmit gain for use with a carbon-type telephone set.

* * * * *